(12) United States Patent
Kim

(10) Patent No.: US 7,746,410 B2
(45) Date of Patent: *Jun. 29, 2010

(54) PICTURE ADJUSTMENT METHOD AND APPARATUS FOR VIDEO DISPLAY APPLIANCE

(75) Inventor: Byung Han Kim, Kyungsangbuk-Do (KR)

(73) Assignee: LG Electronics Inc., Seoul (KR)

( * ) Notice: Subject to any disclaimer, the term of this patent is extended or adjusted under 35 U.S.C. 154(b) by 1170 days.

This patent is subject to a terminal disclaimer.

(21) Appl. No.: 10/952,794

(22) Filed: Sep. 30, 2004

(65) Prior Publication Data

US 2005/0044507 A1    Feb. 24, 2005

Related U.S. Application Data

(63) Continuation of application No. 09/925,682, filed on Aug. 10, 2001, now Pat. No. 6,856,332.

(30) Foreign Application Priority Data

Aug. 11, 2000  (KR) ............................... 2000-46630

(51) Int. Cl.
 *H04N 5/50* (2006.01)
 *G09G 5/00* (2006.01)

(52) U.S. Cl. .................. 348/569; 715/810; 715/716; 715/719; 715/821; 715/822; 715/824

(58) Field of Classification Search ............. 348/569, 348/563, 734, 731, 564, 570; 715/810–862, 715/716, 719
See application file for complete search history.

(56) References Cited

U.S. PATENT DOCUMENTS

| | | | | | |
|---|---|---|---|---|---|
| 5,287,514 | A | * | 2/1994 | Gram | 345/826 |
| 5,331,337 | A | * | 7/1994 | Kabeya et al. | 345/172 |
| 5,384,910 | A | * | 1/1995 | Torres | 345/810 |
| 5,499,040 | A | * | 3/1996 | McLaughlin et al. | 715/823 |
| 5,689,718 | A | * | 11/1997 | Sakurai et al. | 715/205 |
| 5,717,848 | A | * | 2/1998 | Watanabe et al. | 345/474 |
| 5,729,734 | A | * | 3/1998 | Parker et al. | 707/9 |
| 5,781,247 | A | * | 7/1998 | Wehmeyer et al. | 348/569 |
| 6,057,813 | A | * | 5/2000 | Matsumoto | 345/26 |
| 6,078,327 | A | * | 6/2000 | Liman et al. | 715/854 |
| 6,129,449 | A | * | 10/2000 | McCain et al. | 700/244 |
| 6,348,952 | B1 | * | 2/2002 | Jeong | 348/569 |
| 6,400,377 | B1 | * | 6/2002 | Hiraka et al. | 345/716 |
| 6,493,005 | B1 | * | 12/2002 | Wu | 345/804 |
| 7,237,253 | B1 | * | 6/2007 | Blackketter et al. | 725/61 |

* cited by examiner

*Primary Examiner*—M. Lee
(74) *Attorney, Agent, or Firm*—Lowe Hauptman Ham & Berner LLP

(57) ABSTRACT

Picture adjustment apparatus and methods for a video display appliance, include: a memory for storing information pertaining to at least one apparatus adjustment on-screen display (OSD), the adjustment OSD information including configurable OSD accessibility information, and a control section that processes the stored OSD information. The control section is configured to output OSD data to control display of each OSD, the accessibility of each OSD distinguishable in accordance with the stored OSD accessibility information, wherein an accessible OSD is displayed differently than an inaccessible OSD.

12 Claims, 6 Drawing Sheets

PICTURE ADJUSTMENT METHOD AND APPARATUS FOR VIDEO DISPLAY APPLIANCE

This is a Continuation of application Ser. No. 09/925,682 filed Aug. 10, 2001 now U.S. Pat. No. 6,856,332. The entire disclosure of the prior application is hereby incorporated by reference herein in its entirety.

BACKGROUND OF THE INVENTION

1. Field of the Invention

The present invention relates generally to a video display appliance, and more particularly, to a picture adjustment method and apparatus for a video display appliance.

2. Description of the Related Art

In general, a video display appliance such as a monitor has a picture adjustment function, with which a user can adjust the brightness, contrast or size of the screen.

The following is a description of a conventional picture adjustment apparatus for a video display appliance made with reference to FIG. 1. A control section 10 of the video display appliance controls the whole operation of the video display appliance, and processes a user's command inputted through a key manipulation section 20. The control section 10 also performs the picture adjustment in accordance with the user's command, and provides an on-screen display (OSD) output processing section 30 with OSD data representing the picture adjustment state or result. The OSD output processing section 30 displays the OSD according to the OSD data provided from the control section 10 on a display section 40. The key manipulation section 20 includes a plurality of keys and interfaces the user and the control section 10.

The operation of the conventional picture adjustment apparatus as constructed above will now be explained. When a user desires picture adjustment, he/she provides the control section 10 with a command for entering a picture adjustment process by means of the key manipulation section 20. In accordance with the command, the control section 10 displays a picture adjustment OSD on the screen of the display section 40. FIG. 2 shows an example of the picture adjustment OSD. The picture adjustment OSD includes a variety of menus that can control the brightness, contrast, size, shape, etc. of the picture. The user can command various kinds of picture adjustment through those menus.

The control section 10 performs the picture adjustment by receiving a picture adjustment command through the picture adjustment OSD, and displays the result of picture adjustment on the picture adjustment menu. Thus, the user can easily confirm the picture adjustment state and the result thereof.

However, the picture adjustment OSD includes a number of picture adjustment menus that are quite difficult to adjust. For instance, it is not only difficult to adjust the shape of the screen, colors, OSD language, removing of wave patterns or color bleeding but also difficult to return them to their original state.

As described above, the conventional apparatus for adjusting the picture of a video display appliance puts the burden of adjusting such difficult picture adjustment menus on the user, and this poses the problems of deteriorating the picture display state due to misadjustment of the picture adjustment menus by an unskillful user or a child, as well as of disabling restoration of the picture display state to the original state.

SUMMARY OF THE INVENTION

It is, therefore, an object of the present invention to provide a picture adjustment method and apparatus for a video display appliance that improves the reliability of the product by preventing unskillful users from accessing picture adjustment menus that are difficult to adjust and return to their original state.

To achieve the above object, there is provided a picture adjustment method for a video display appliance, comprising the steps of: selecting and determining accessible picture adjustment OSDs; if entry into a picture adjustment process is commanded after the determination of the accessible picture adjustment OSDs, displaying the accessible picture adjustment OSDs; if a command for picture adjustment is inputted through any one of the displayed picture adjustment OSDs, checking whether the corresponding picture adjustment OSD is accessible; performing the picture adjustment in accordance with the inputted command for picture adjustment if it is checked that the corresponding picture adjustment OSD is accessible; and ignoring the inputted command for picture adjustment if it is checked that the corresponding picture adjustment OSD is not accessible.

In another aspect of the present invention, there is provided a picture adjustment apparatus for a video display appliance, comprising: a key manipulation section for receiving information on accessible picture adjustment OSDs from a user; a memory for storing information on the accessible picture adjustment OSDs; a display section for displaying various kinds of information; an OSD output processing section for displaying an OSD according to OSD data on the display section; and a control section for providing the OSD output processing section with the OSD data for displaying the picture adjustment OSDs after receiving and storing the information on the accessible picture adjustment OSDs, and processing as an effective command only the command for picture adjustment inputted through the picture adjustment OSD that has been determined to be accessible.

BRIEF DESCRIPTION OF THE DRAWINGS

The above and other objects, features and advantages of the present invention will become more apparent from the following detailed description when taken in conjunction with the accompanying drawings, in which.

DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
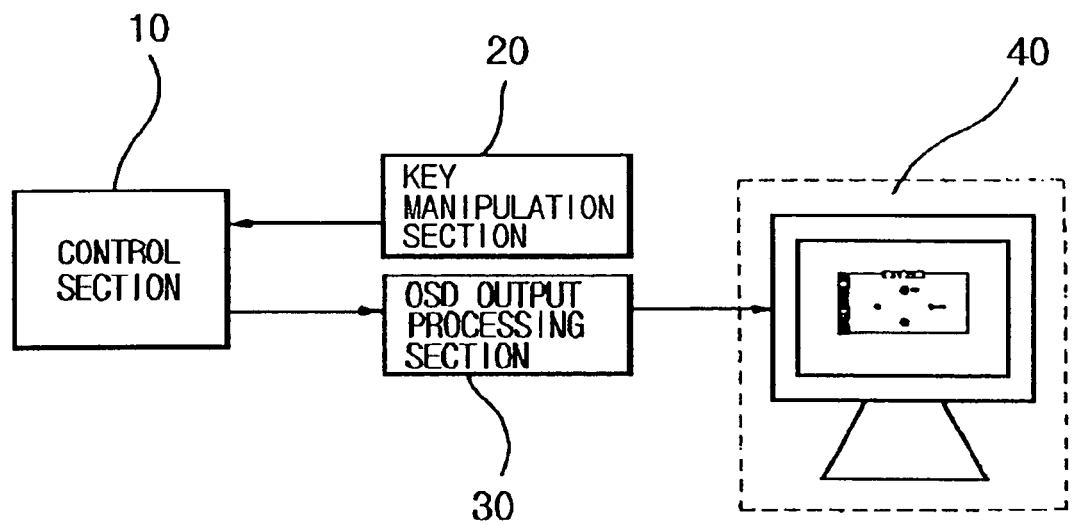
FIG. 1 is a block diagram illustrating a schematic construction of a conventional picture adjustment apparatus for a video display appliance.
Figure 2:
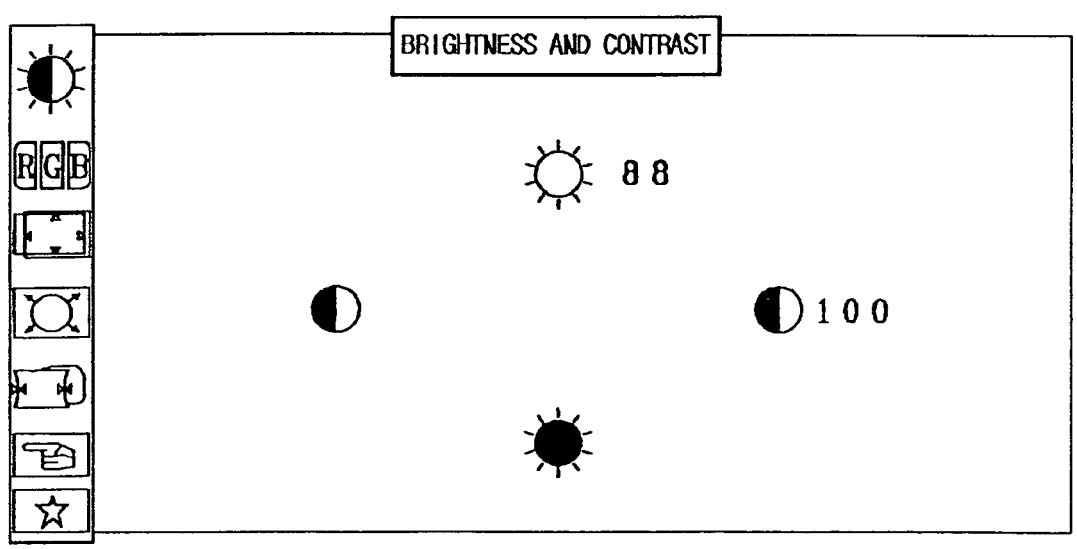
FIG. 2 is a view illustrating a picture adjustment menu displayed according to the conventional picture adjustment apparatus.
Figure 3:
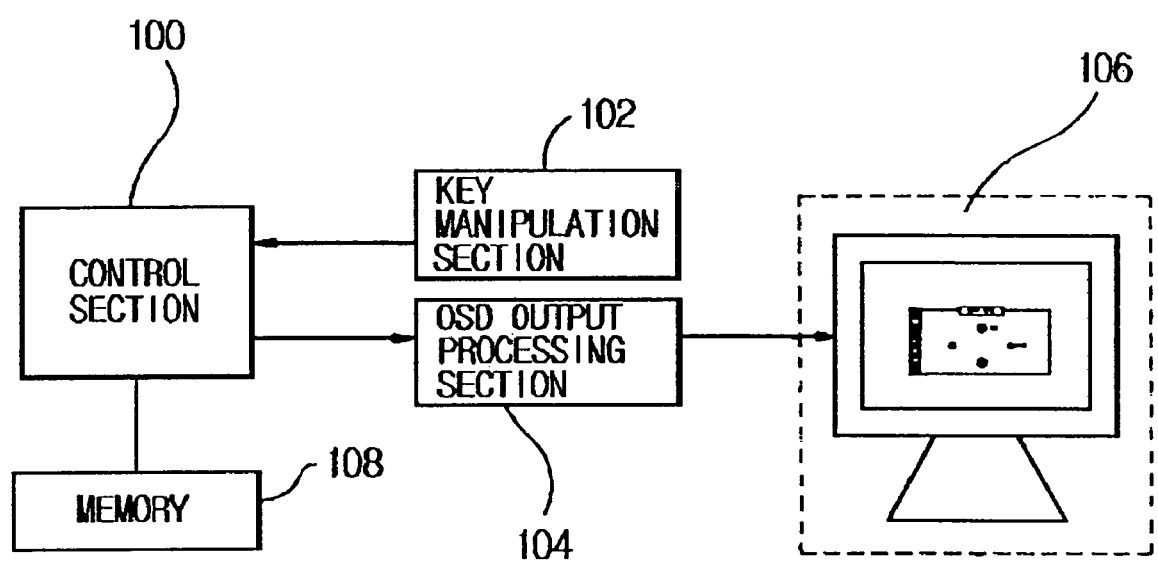
FIG. 3 is a block diagram illustrating a schematic construction of a picture adjustment apparatus for a video display appliance according to a preferred embodiment of the present invention.

FIG. 3 is a block diagram illustrating a schematic construction of a picture adjustment apparatus for a video display appliance according to a preferred embodiment of the present invention. Referring to FIG. 3, a control section 100 controls the whole operation of the video display appliance according to the preferred embodiment of the present invention, and processes a user's command inputted through a key manipulation section 102. The control section 100 provides an OSD output processing section 104 with OSD data for displaying a plurality of picture adjustment OSDs in accordance with the user's command. Each of the picture adjustment OSDs includes a plurality of picture adjustment menus. The control section 100 can display each one of the picture adjustment OSDs in turn in accordance with the user's command.

The control section 100 blocks another user's access to the picture adjustment OSDs that have been selected by a specified user. Here, the specified user refers to a user or managing staff who is capable of easily adjusting picture adjustment menus that are fairly difficult to be adjusted. The specified user may command entry into a menu for determining whether the picture adjustment is accessible. Input of such command may be turning on a power source of the video display appliance in a state that two or more predetermined keys are simultaneously inputted.

Once the picture adjustment is determined to be accessible, the control section 100 displays the picture adjustment OSD determined to be accessible in a black color representing an active state, while displaying the picture adjustment OSD determined not to be accessible in a gray color representing an inactive state. By doing so, the user can easily discriminate the accessible picture adjustment menus from the inaccessible picture adjustment menus.

The OSD output processing section 104 displays the OSD according to the OSD data provided from the control section 100 on a display section 106. A memory 108 stores various kinds of information, and in particular, information on the accessible picture adjustment OSDs under the control of the control section 100.

The operation of the picture adjustment apparatus according to the preferred embodiment of the present invention will be explained with reference to the accompanying drawings.

Figure 4:
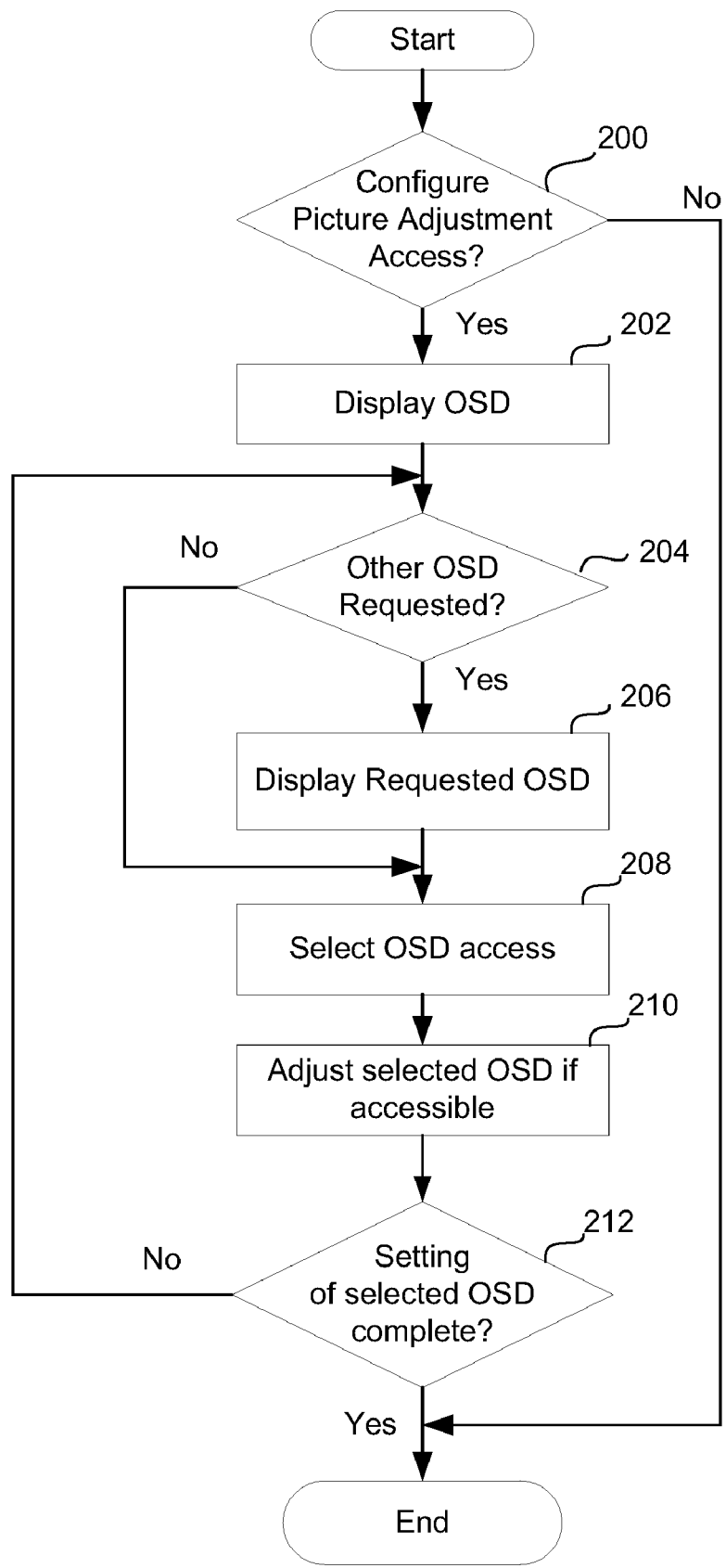
FIGS. 4 and 5 are flowcharts illustrating a picture adjustment method for a video display appliance according to the present invention.

The process of determining the accessible picture adjustment OSDs by the control section 100 will first be described with reference to the flowchart of FIG. 4. The specified user can command entry into the menu for determining the accessibility of the picture adjustment by turning on the power source of the video display appliance in a state that two or more predetermined keys are simultaneously inputted among the keys of the key manipulation section 102. Once the specified user commands entry into the menu for determining the accessibility of the picture adjustment (step 200), the control section 100 displays any one of the plurality of picture adjustment OSDs on a display section 106 (step 202). If the specified user requests the display of another picture adjustment OSD through the key manipulation section 102 after displaying the picture adjustment OSD as described above (step 204), the control section 100 displays the picture adjustment OSD requested by the specified user (step 206). The picture adjustment OSDs to be displayed are brightness, contrast, colors, position and shape of the screen, language determination, special functions, etc.

If the specified user selects not to display another picture adjustment OSD, step 206 is skipped and control passes to step 208.

If the specified user inputs information on selecting the accessible picture adjustment while the picture adjustment OSD is displayed (step 208), the control section 100 determines whether the corresponding picture adjustment OSD is accessible in accordance with the selected information (step 210). The control section 100 stores the determined information in the memory 108 so as to be used whenever displaying the picture adjustment OSD.

Thereafter, the control section 100 determines whether or not the specified user requests termination of the determination of the picture adjustment accessibility by means of the key manipulation section 102 (step 212). The control section 100 continuously performs the determination of the accessible picture adjustment OSDs until the command for termination is received.

Here, when selecting the accessible picture adjustment OSD, the specified user determines the picture adjustment OSD including the picture adjustment menus such as brightness, contrast, position of the screen, size of the screen, which are easily retrievable to the original state through manipulation by an unskillful user, to be accessible. The specified user determines the picture adjustment OSD including the picture adjustment menus such as shape of the screen, colors, OSD language, removing of wave patterns or color bleeding, which are not easily reset to the original state through manipulation by an unskillful user, to be unaccessible. Of course, the picture adjustment OSD that has been determined to be accessible can be re-determined to be accessible if necessary.

As described above, once the accessibility of the picture adjustment OSD is determined, the specified user or other users (hereinafter, referred to the "user") can perform the picture adjustment by using the picture adjustment OSD that has been determined to be accessible.

Figure 5:
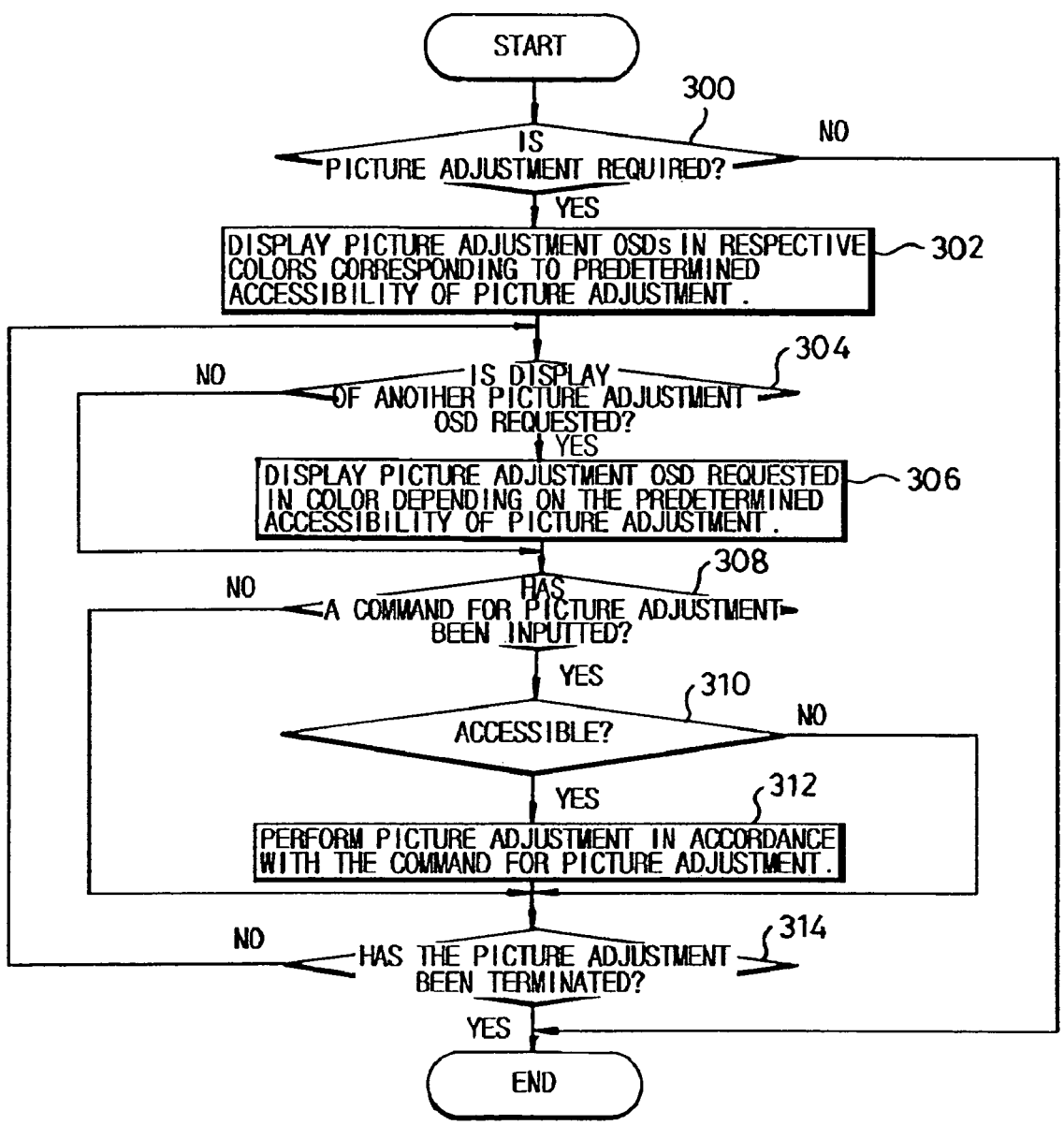
Figure 6:
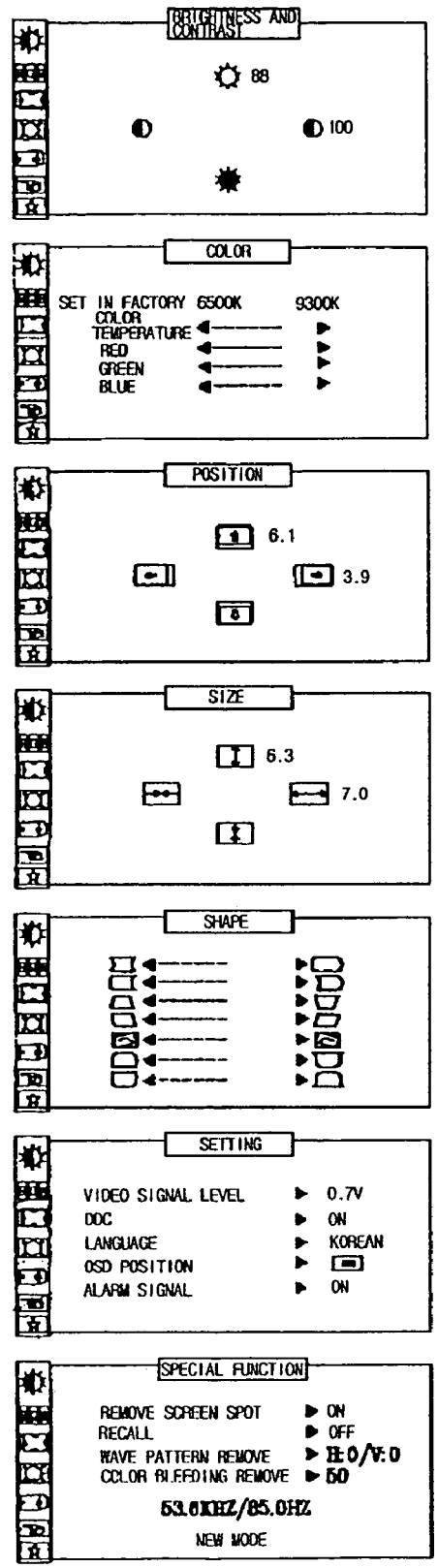
FIGS. 6 and 7 are views illustrating picture adjustment menus displayed according to the preferred embodiment of the present invention.
Figure 7:
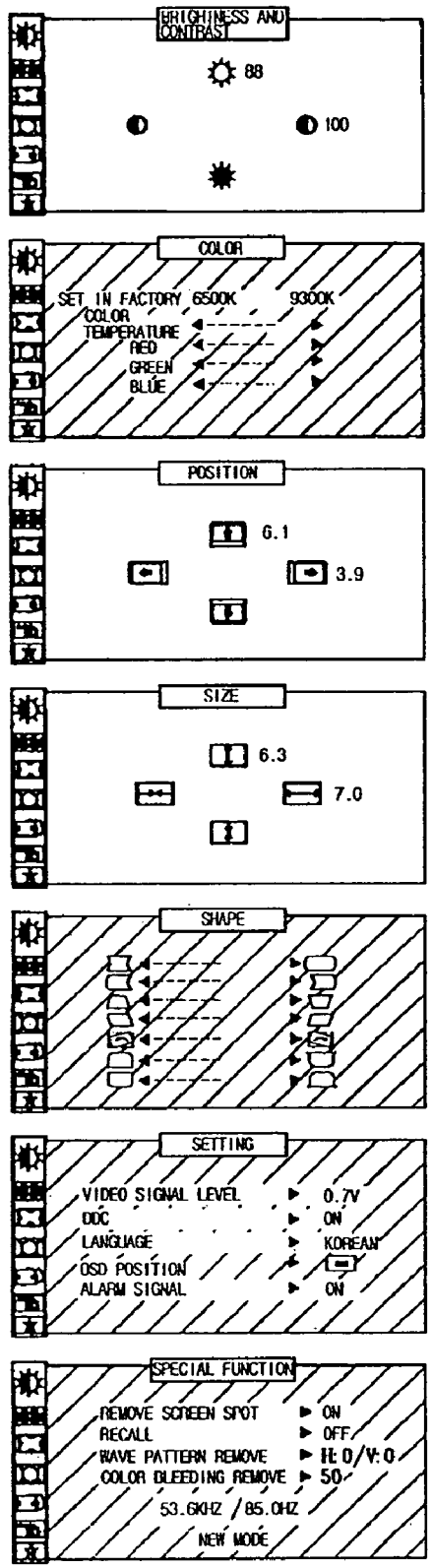

The process of picture adjustment performed by the control section 100 will now be explained with reference to the flowchart of FIG. 5. The user may command the picture adjustment by means of the key manipulation section 102. If the user commands the picture adjustment (step 300), the control section 100 displays any one of the plurality of picture adjustment OSDs on the display section 106 (step 302). In particular, the control section 100 displays the picture adjustment OSD with a color corresponding to the pre-determined accessibility of picture adjustment. Thereafter, if the user requests a display of another picture adjustment OSD through the key manipulation section 102 after display of the picture adjustment OSD as described above (step 304), the control section 100 displays the requested picture adjustment OSD (step 306). The picture adjustment OSDs that can be displayed are brightness, contrast, colors, position and shape of the screen, OSD language, special functions, etc. as shown in FIG. 7. Each picture adjustment OSD is displayed either in black color or in gray color depending on the pre-determined accessibility of picture adjustment. That is, the shape of the screen, colors, OSD language, removing wave patterns or color bleeding, which have been determined to be unaccessible, are displayed in gray color, while the other picture adjustment OSDs are displayed in black color. The control section 100 ignores the command for picture adjustment made through the picture adjustment OSD displayed in gray color to prevent misadjustment of the picture adjustment menus, which are not easily reset to the original state, by an unskillful user.

After displaying the picture adjustment OSD as described above, the control section 100 searches whether or not the user inputs a command for picture adjustment through the key manipulation section 102 (step 308). If the user commands the picture adjustment, the control section 100 searches whether or not the corresponding picture adjustment OSD has been determined to be accessible (step 310). The control section performs the picture adjustment in accordance with the command for picture adjustment if the corresponding picture adjustment OSD has been determined to be accessible (step 312). Otherwise, the control section 100 ignores the command for picture adjustment.

After performing the picture adjustment in accordance with the command for picture adjustment, the control section 100 searches whether or not the user commands termination of the picture adjustment through the key manipulation section 102 [step 314]. The control section 100 performs the picture adjustment requested by the user until the user commands the termination of the picture adjustment.

As described above, the present invention has an advantage in that it can improve the reliability of the product by preventing unskillful users from accessing picture adjustment menus that are not easily adjusted and retrieved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An adjustment apparatus for an appliance, comprising:
   a memory for storing information pertaining to at least one apparatus adjustment on-screen display (OSD), the adjustment OSD information including configurable OSD accessibility information;
   a key manipulation section configured to receive OSD accessibility information entered by a specific user; and
   a control section that processes the stored OSD information, wherein the control section is configured to output OSD data to control display of each OSD, the accessibility of each OSD controlled by individual key manipulations and distinguishable in accordance with the stored OSD accessibility information, wherein an accessible OSD is displayed differently than an inaccessible OSD and the OSD is displayed, including a detail information on each accessible OSD and each inaccessible OSD.

2. The apparatus of claim 1, wherein said control section is configured to control the display of an OSD in a color corresponding to the OSD's stored accessibility information.

3. An adjustment method for providing diverse adjustment functions for an appliance through a plurality of OSDs (on-screen displays), the method comprising the steps of:
   displaying an adjustment OSD configuration menu configured to display accessible and inaccessible OSDs;
   accessing each OSD by a separate key manipulation;
   receiving a specified user command to set the accessibility of a selected adjustment OSD;
   storing accessibility information pertaining to the selected OSD in a memory;
   exiting the OSD configuration menu; and
   displaying an accessible OSD differently than an inaccessible OSD, wherein the displayed OSD includes a detail information on each accessible OSD and each inaccessible OSD.

4. The apparatus of claim 1, further comprising:
   an OSD output processing section configured to receive the OSD data from the control section and output OSD display information to a display device.

5. The apparatus according to claim 4, wherein the control section is further configured to:
   receive a picture adjustment command request from a user;
   determine the accessibility of at least one adjustment OSD in accordance with the stored accessibility information for each picture adjustment OSD,
   provide the OSD data to the OSD output processing section based upon the stored accessibility information of the at least one picture adjustment OSD, and
   process a command for picture adjustment inputted through the OSD only if the OSD is determined to be accessible.

6. The apparatus according to claim 2, further comprising a display device configured to receive input from the OSD output processing section and display at least one on-screen display (OSD) for adjusting an apparatus.

7. The apparatus according to claim 1, wherein the at least one OSD is a picture adjustment OSD further comprising at least one picture adjustment menu.

8. The method according to claim 3, wherein the adjustment method comprises adjusting a picture displayed on a video display appliance.

9. The method according to claim 3, wherein the adjustment method further comprises:
   performing a user requested adjustment command if a corresponding OSD is accessible; and
   ignoring the requested adjustment command if the corresponding OSD is inaccessible.

10. The apparatus according to claim 7, wherein adjustment OSDs that are predetermined as inaccessible include shape of a screen, colors, OSD language, removing wave patterns, and color bleeding.

11. A picture adjustment method, comprising:
    configuring a picture adjustment on-screen display (OSD) as accessible or inaccessible; and
    displaying the configured OSD in accordance with stored OSD accessibility information, such that an accessible OSD is displayed differently than an inaccessible OSD, wherein displaying the configured OSD includes displaying a detail information corresponding to a type of the OSD;
    wherein each OSD is individually accessed by separate key manipulations.

12. The picture adjustment method according to claim 11, further comprising:
    entering a picture adjustment menu by operation of a specified user;
    configuring, by the specified user, OSD accessibility information of a selected OSD; and
    blocking an inaccessible OSD from being accessed by another user.

* * * * *